United States Patent [19]

Miller

[11] Patent Number: 4,487,433

[45] Date of Patent: Dec. 11, 1984

[54] ANTI-ROTATION COUPLING

[75] Inventor: Henry W. Miller, Dallas, Tex.

[73] Assignee: Mobil Oil Corporation, New York, N.Y.

[21] Appl. No.: 369,328

[22] Filed: Apr. 16, 1982

[51] Int. Cl.³ .............................................. F16L 15/00
[52] U.S. Cl. .......................................... 285/81; 285/91; 285/175; 285/330; 285/333; 285/DIG. 14; 29/526 R
[58] Field of Search ....................... 285/84, 85, 86, 91, 285/92, 81, 355, 340, 333, 175, 330, DIG. 14; 29/526 R

[56] References Cited

U.S. PATENT DOCUMENTS

| 228,209 | 6/1880 | Meier | 285/91 |
|---|---|---|---|
| 1,559,874 | 11/1925 | Holland | 285/85 |
| 2,296,198 | 9/1942 | Boynton | 285/91 |
| 2,417,025 | 3/1947 | Volpin | 285/91 |
| 4,397,484 | 8/1983 | Miller | 285/333 X |

Primary Examiner—Dave W. Arola
Attorney, Agent, or Firm—A. J. McKillop; M. G. Gilman; F. J. Kowalski

[57] ABSTRACT

A mechanical coupling is disclosed wherein similarly pitched and profiled but oppositely threaded threads are provided for two couplings incorporating an anti-rotation member such as a tongue-and-groove or a drill hole and dowel pin.

9 Claims, 2 Drawing Figures

U.S. Patent  Dec. 11, 1984  4,487,433

ANTI-ROTATION COUPLING

BACKGROUND OF THE INVENTION

In many applications, the cost of maintenance man hours has created a need for maintenance free devices. This is particularly true of subsea devices which lie many hundreds or thousands of feet below the surface of the ocean.

In subsea oil production, when a cluster of wells have been drilled and completed, a vertical conduit or plurality of flowlines must be connected between the wells and the surface facility for processing the oil and gas before transporting to a refinery.

In many instances the surface facility is a floating vessel requiring the flow-line bundle end terminates to be flexibly connected at the surface.

Normally, this requires several pipes in a flowline bundle, each pipe must be a continuous conduit from the surface to the seafloor. The connections between these pipes must be made easily and solidly. Normally, the sections of flowline pipes have been joined by screwing clockwise each pipe into a coupling. Rotation of the coupling in a counter clockwise direction could result from dynamic motions and thermal variations. One means of preventing this occurance is to weld the coupling and pipe with a steel strip member. Another means would be to apply an epoxy adhesive to the pipe threads. Both of these methods are time consuming when joining or breaking out the connections.

SUMMARY OF THE INVENTION

The present invention pertains to conduit couplings and more particularly to conduit couplings which are used in locations where access is difficult if not impossible such as subsurface marine environments. Two pipe ends are screwed into each other. A coupling having two halves is screwed on to each pipe. The threads for each half of the coupling end section of pipe are machined with the same pitch and profile. One segment comprising one pipe and one coupling half has a left hand thread while the other has a right hand thread. The two coupling halves incorporate an anti-rotational member such as a tongue and groove in one embodiment and a drill hole and dowel pin in an alternate embodiment. The two coupling halves are screwed in the same rotational direction for alignment of the anti-rotational member prior to face to face make-up. The coupling halves are locked together and placed in tension by left hand rotation.

DESCRIPTION OF THE PREFERRED EMBODIMENT

Pipes rotating and becoming uncoupled has been a serious problem for quite some time. However, with the advent of deep sea technology, the problem has become critical. If, for example, a subsea pipe carrying liquid hydrocarbons, such as oil, separates on the ocean floor, large quantities of oil will enter the water and float to the surface causing a serious pollution hazard. This type of accident is preferably prevented since, once it occurs, not only the repair is extremely difficult, but also the consequences are irreversible.

Figure 1:
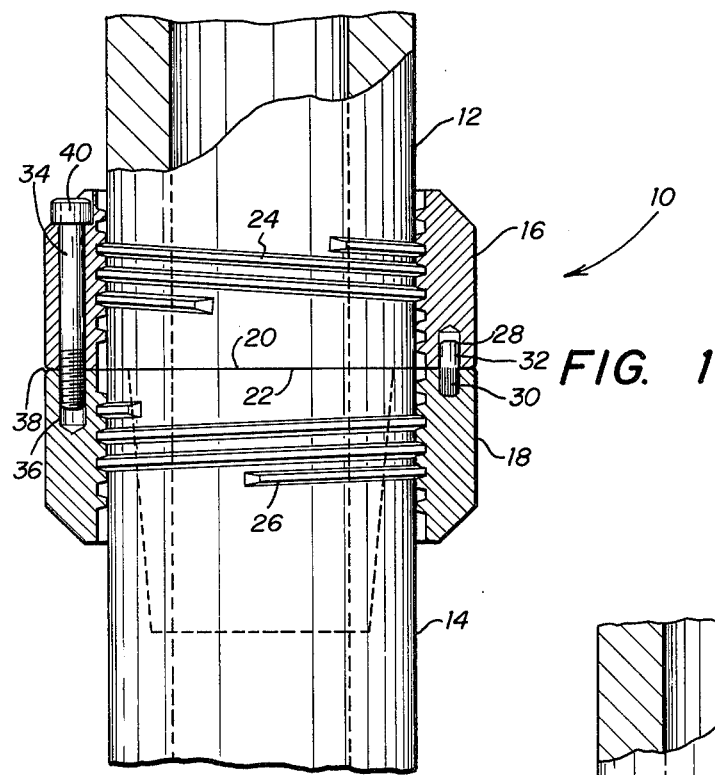
FIG. 1 is a side view of an anti-rotational coupling system.

Referring now to FIG. 1, the preferred embodiment of an anti-rotational coupling system 10 is illustrated having male pipe member 12, female pipe member 14 and coupling halves 16 and 18.

In assembling the anti-rotational coupling system of FIG. 1, coupling halves 16 and 18 are screwed on pipe members 12 and 14, respectively, and backed off from their respective ends, 20 and 22. Male pipe member 12 is screwed into female pipe member 14 until end 20 of pipe member 12 abuts end 22 of pipe member 14. Pipe member 12 has left hand threads 24 while pipe member 14 has right hand threads 26. Coupling half 16 is rotated on pipe threads 24 to draw it closer to the pipe end 20. Coupling half 18 is rotated on pipe threads 26 to draw it closer to pipe end 22. Pipe threads 24 and 26 are machined with the same pitch and profile, the only difference being that one is left hand thread while the other is right hand thread. Coupling halves 16 and 18 have corresponding drill holes 28 and 30 adapted to receive dowel pin 32. Coupling half 16 is drilled to have a cylindrical hole 34 through its entire length. Coupling half 18 has a drill hole 36 beginning at its abutting surface, 38 and terminating approximately half way through the length of coupling half 18. Although the preferred embodiment illustrates drill hole 36 and coupling half 18 as extending only partially through coupling half 18, the drill hole may be extended entirely through the coupling half 18 and terminate in a nut and lock washer type of arrangement. Inserted within and extending through hole 34 is machine screw 40. Machine screw 40 preferably has sufficient length to extend into drill hole 36 which is preferably adapted with threads to receive machine screw 40. However, a significantly shorter screw may replace machine screw 40, the only requirement being that a means be provided to restrict separation of coupling half 16 and coupling half 18. As coupling half 16 and 18 approach each other, dowel pin 32 is inserted in holes 28 and 30. Dowel pin 32 requires that coupling halves 16 and 18 be rotated in unison. When coupling halves 16 and 18 are located clockwise, they approach each other since threads 24 and 26 are left hand threads and right hand threads, respectively. Coupling halves 16 and 18 may be appropably torqued when their surfaces abut each other. Machine screw 40 is inserted in drill hole 34 and screwed into drill hole 36. By tightening machine screw 40, the distance between coupling halves 16 and 18 may be insured.

Thus, anti-rotational coupling system is complete. Coupling halves 16 and 18 are secured to pipe members 12 and 14 respectively and are holding pipe end 20 contiguous with pipe end 22. Dowel pin 32 prevents rotation of coupling half 16 with respect to coupling half 18. In other words, coupling half 16 and 18 must be rotated in unison. Machine screw 40 is in place and maintaining the distance between coupling half 16 and coupling half 18. Rotation of coupling half 16 and 18 in one direction is prevented by each coupling half blocking the path of the other. Rotation of coupling halves 16 and 18 in the opposite direction is prevented by machine screw 40 maintaining the difference between coupling halves 16 and 18.

Figure 2:
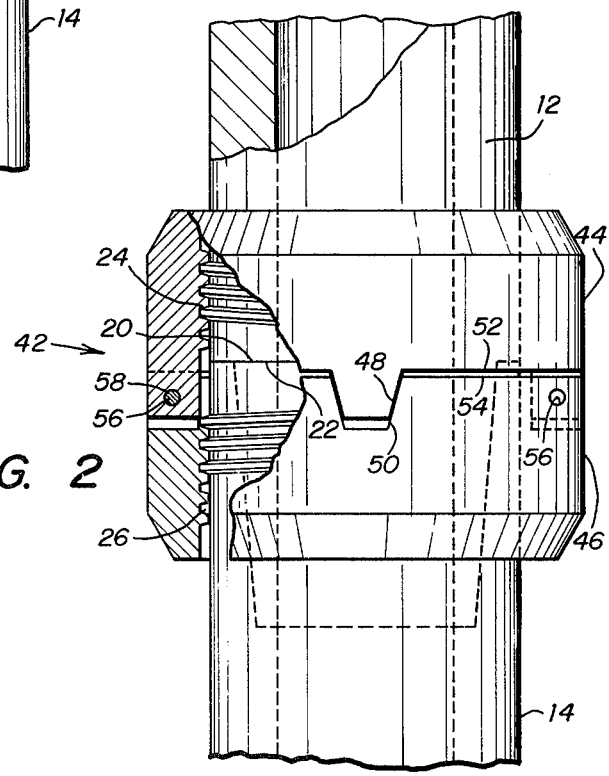
FIG. 2 is a side view of an alternate embodiment of FIG. 1.

Referring now to FIG. 2, an alternate embodiment 42 of the anti-rotational coupling system of the present invention is illustrated as having male pipe member 12 and female pipe member 14 having their respective ends 20 and 22 abutted against each other. Coupling halves 44 and 46 are illustrated on pipe member 12 and pipe member 14, respectively. Threads 24 and 26 on pipe members 12 and 14 have the same pitch and profile. However, one is left handed thread and the other is right handed thread. Coupling half 44 has tongue portions 48 which are adapted to be received by groove portions 50 of coupling half 46. Coupling halves 44 and 46 are rotated clockwise and approach each other. Coupling halves 44 and 46 are then rotated with respect to each other to line up tongue 48 into groove 50. Coupling halves 44 and 46 are then rotated in unison until leading edge 52 of coupling half 44 abuts leading edge 54 of coupling half 46. A hole 56 has been drilled on either side of coupling half 44 and coupling half 46 and is in line through tongue 48 and the ungrooved portion of coupling half 46. Hole 56 is adapted to receive a roll pin 58 when leading edge 54 of coupling half 46 and leading edge 52 of coupling half 44 abut one another. Roll pin 58 prevents changing the distance between leading edge 52 and leading edge 54. Tongue 48 and groove 50 prevent rotation of coupling halves 44 and 46 with respect to each other.

Thus, coupling halves 44 and 46 must be rotated in unison due to the effect of tongue 48 with groove 50. Rotation of coupling halves 44 and 46 in one direction is prevented by the abutment of leading edges 52 and 54. Rotation of coupling halves 44 and 46 in the opposite direction is prevented by roll pin 58 maintaining the separation distance between coupling half 46 and coupling half 44.

The anti-rotational coupling systems of both the preferred and alternate embodiments prevent the decoupling of pipes or conduits due to rotation caused by vibration or downline torque. However, it should be understood that both the preferred and alternate embodiments are by way of illustration only and the present invention should not be limited thereto but only by the scope of the following claims.

What is claimed is:

1. A system for providing an anti-rotational coupling joint comprising:
    a first pipe having an end with a first set and a second set of external threads; said second set of threads wound in a predetermined direction at a predetermined pitch;
    a second pipe having an end with an internal set of threads and an external set of threads, said external set wound in the opposite of said predetermined direction at said predetermined pitch and said internal set of threads for receiving said first set of external threads;
    a coupling having a first half and a second half having threads in threaded engagement with said second set of threads on said first pipe and said external set of threads on said second pipe; and
    means for preventing rotation of said first half with respect to said second half.

2. The system according to claim 1 wherein said means for preventing rotation comprises:
    an annular hole in each of said first half and said second half adapted to receive a pin; and
    a locking pin inserted in through said annular holes.

3. The system according to claim 2 also including means for preventing said first half from withdrawing from said second half.

4. The system according to claim 3 wherein said means for preventing withdrawing includes a locking screw.

5. The system according to claim 1 wherein said means for preventing rotation includes a tongue and groove configuration on said first half and said second half.

6. The system according to claim 5 also including means for preventing said first half from withdrawing from said second half.

7. The system according to claim 6 wherein said means for preventing withdrawing includes a hole through a tongue of said first half and a hole through said tongue of said second half, each hole adapted to receive a locking pin; and
    a locking pin inserted through said holes.

8. A method for providing an anti-rotational coupling system for a pipe joint having a first pipe end screwed into a second pipe end comprising the steps of:
    providing oppositely wound external threads having the same pitch on said first pipe end and said second pipe end;
    providing coupling halves having internal threads in threaded engagement with said oppositely wound threads;
    rotating said coupling halves to approach each other; and
    preventing rotation of one coupling half with respect to the other.

9. The method according to claim 8 also including the step of preventing said one coupling half from withdrawing from said other coupling half.

* * * * *